United States Patent [19]

Tagnon

[11] 4,040,752
[45] Aug. 9, 1977

[54] LASER UNIT WITH A LASER BEAM AUTOMATICALLY ALIGNED TO THE VERTICAL DIRECTION

[75] Inventor: Luc André Tagnon, Saint Mande, France

[73] Assignee: Essilor International (Compagnie Générale d'Optique), Joinville LePont, France

[21] Appl. No.: 562,891

[22] Filed: Mar. 28, 1975

[30] Foreign Application Priority Data

Apr. 24, 1974   France ................................ 74.14229

[51] Int. Cl.² ............................................. G01C 9/18
[52] U.S. Cl. .................................... 356/249; 356/148; 350/287
[58] Field of Search ............... 356/148, 149, 172, 248, 356/249, 250; 350/287

[56] References Cited

U.S. PATENT DOCUMENTS

| | | | |
|---|---|---|---|
| 1,285,775 | 11/1918 | Mihalyi | 350/287 |
| 2,147,156 | 2/1939 | Geffchen et al. | 350/287 |
| 3,324,557 | 6/1967 | Hodges | 356/250 |
| 3,655,274 | 4/1972 | Craig | 356/249 |
| 3,684,381 | 8/1972 | Zoot | 356/249 |
| 3,729,266 | 4/1973 | Mason et al. | 356/250 |
| 3,771,876 | 11/1973 | Ljungdahl et al. | 356/250 |
| 3,858,984 | 1/1975 | Denton et al. | 356/250 |

*Primary Examiner*—Vincent P. McGraw

[57] ABSTRACT

Laser unit for directing a laser beam in a strictly vertical direction, comprising a laser proper having a substantially vertical axis, an afocal system, an optical device for automatically correcting the verticality of the laser beam, and a base structure provided with means for supporting the assembly of said laser, afocal system and optical device in such position that the laser axis be substantially vertical. This invention is applicable to all fields and techniques in which it is desired to determine with the maximum precision the vertical at a given locus where the laser is installed.

12 Claims, 7 Drawing Figures

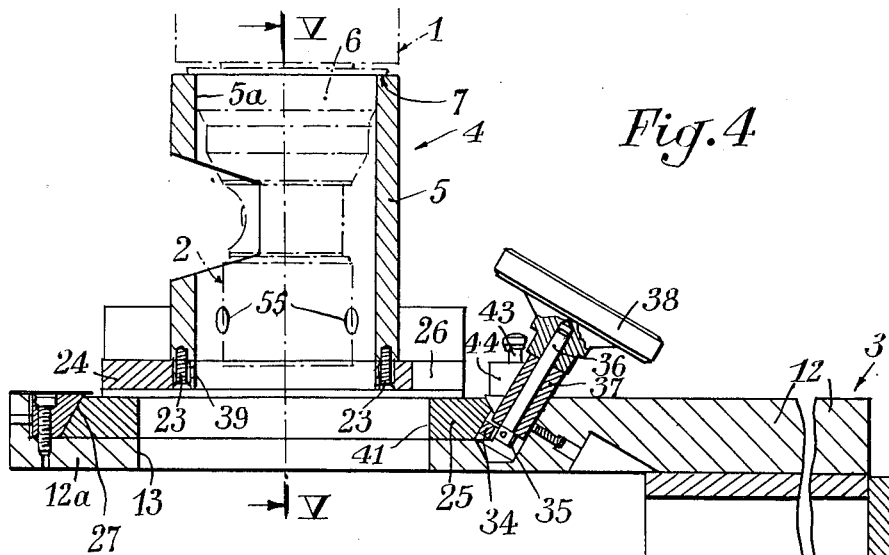
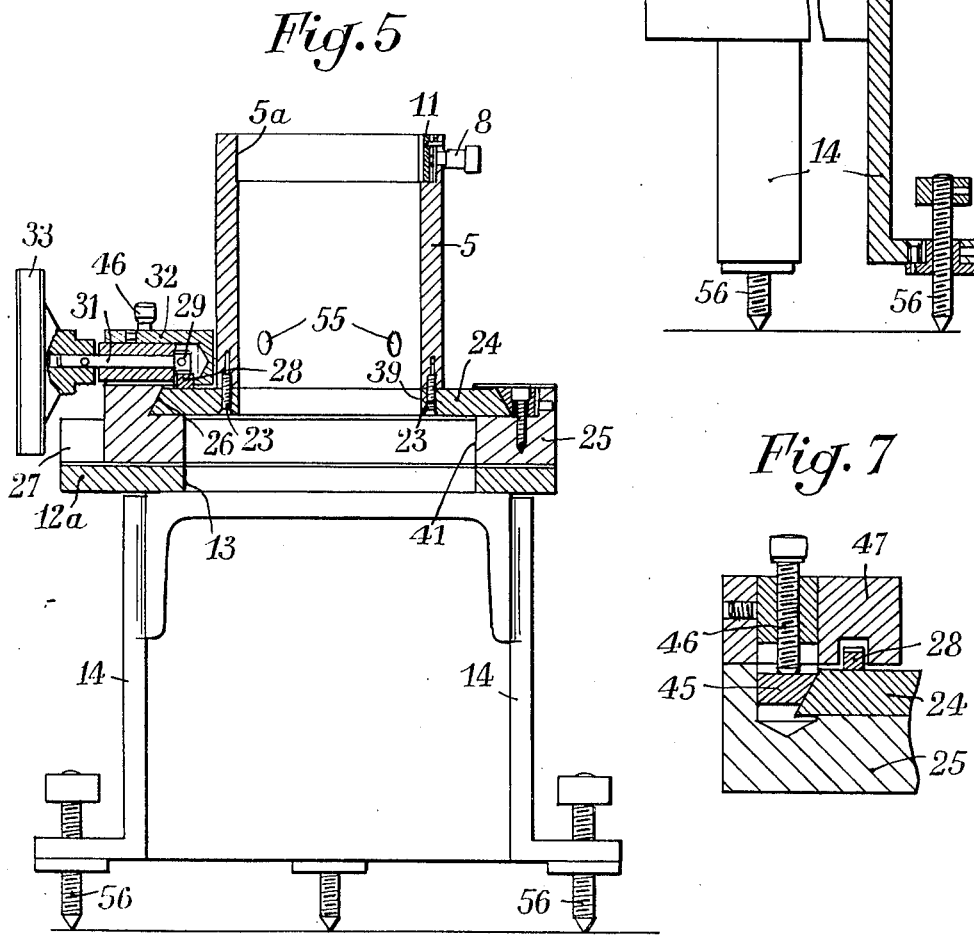

LASER UNIT WITH A LASER BEAM AUTOMATICALLY ALIGNED TO THE VERTICAL DIRECTION

BACKGROUND OF THE INVENTION

The present invention relates in general to laser units and has specific reference to an improved laser unit capable of directing a laser beam in a strictly vertical direction and adapted to be used if necessary in combination with means for reversing the direction of the laser beam or means for reflecting said laser beam at 90°.

The laser unit according to this invention is applicable to various techniques such as topometry, building construction (notably in the construction of elevator pits or hoistways in tall buildings such as skyscrapers) and, more generally, to all fields requiring the determination, with a high degree of precision, of the vertical or horizontal of a given locus, such as the observer's locus.

Therefore the primary object of the present invention is to provide a laser unit capable of directing a laser beam in a strictly vertical direction and, accessorily, in a strictly horizontal direction.

SUMMARY OF THE INVENTION

To this end, the invention provides a laser unit for directing a laser beam in a strictly vertical direction, which comprises a laser proper, an afocal system and a base structure provided with means adapted to support said laser and said afocal system in such a position that the laser has its geometrical axis disposed substantially vertically, said laser unit being characterized in that it comprises an optical device known per se for automatically correcting the verticality of the laser beam emitted by said laser, said optical correction divice being disposed after the afocal system on the substantially vertical path of said laser beam and comprising a pair of superposed coaxial cups containing a liquid having an index of refraction of 1.5, the bottom of each cup consisting at least partly of a parallel-faced transparent blade, said blades being parallel to each other, in that said support means comprise means allowing the assembly of said laser, afocal system and optical correction device to rotate about the substantially vertical axis of said laser beam, in that said pair of cups are housed in a cylindrical case having formed through its top and bottom a pair of aligned apertures permitting the passage of the laser beam, said case being secured to said laser in coaxial relationship thereto, and in that adjustment means adapted to be actuated from outside said case are provided for adjusting the orthogonality of said parallel-faced transparent blades of said pair of cups with respect to the incident laser beam.

BRIEF DESCRIPTION OF THE DRAWING

A detailed description of the present invention will now be given by way of illustration with reference to the attached drawings, in which:

FIG. 4 is a fragmentary view similar to FIG. 1 showing a laser unit according to a modified embodiment of this invention;

FIG. 5 is a section taken along the line V-V of FIG. 4, and

FIGS. 6 and 7 are fragmentary section views showing on a larger scale details of the laser unit illustrated in FIGS. 4 and 5.

DESCRIPTION OF THE PREFERRED EMBODIMENT

Figure 2:
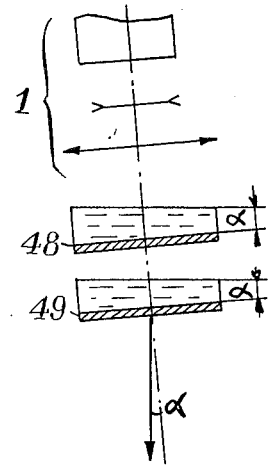
FIG. 2 is a diagram illustrating the basic principle of a device for automatically correcting the verticality of a light beam, which incorporates two liquid prisms.

The laser unit illustrated in the drawings comprises essentially a laser 1 proper having a substantially vertical axis, an afocal system (shown in FIG. 2, but non otherwise designated, an optical device 2 for automatically correcting the verticality of the laser beam, which is located after the afocal system on the substantially vertical path of the laser beam produced by said laser 1, and a base structure 3 provided with means 4 for supporting the laser 1 and the optical device 2 in a position such that the laser axis be substantially vertical.

In the two embodiments illustrated in the drawings the support means 4 comprise a mounting permitting the pivotal movements of the laser 1 about its substantially vertical axis. To this end, the support means 4 comprise more particularly a cylindrical socket 5 having a substantially vertical axis and, at its upper portion, a gauged bore 5a. On the other hand, the laser 1 (comprising optical and electronic components known per se) is enclosed in a housing of which the lower portion comprises a gauged cylindrical bearing section 6 coaxial to the laser beam and an axial bearing surface 7 facing downwards, as shown. The lower portion of the laser 1 is fitted in the socket 5 in such a manner that the axial bearing surface 7 of the laser housing bears on the top edge of said socket 5, and that the cylindrical bearing section 6 is rotatably engaged without any undue play in the gauged bore 5a of socket 4, due to a proper selection of the diameters of said bore 5a and cylindrical bearing section 6, respectively.

Blocking means are provided for preventing, when desired, the laser 1 from rotating in the socket 5. In the embodiment shown in FIG. 1 these blocking means comprise a screw 8 having a knurled head 9 constituting a control knob, said screw 8 engaging a tapped radial hole formed in a ring 9 secured for example by means of screws (not shown) to said socket 5, at the upper end thereof. This screw 8 is adapted to exert a radial pressure against a tongue or strip 5b cut out in the wall of socket 5 so as to press firmly this tongue against the bearing section 6. In the modified construction illustrated in FIGS. 4 and 5, the screw 8 is engaged in a tapped hole formed through the wall of socket 5 and reacts against a crescent-shaped clamping member 11 so as to press same firmly against the cylindrical bearing portion 6.

Figure 1:
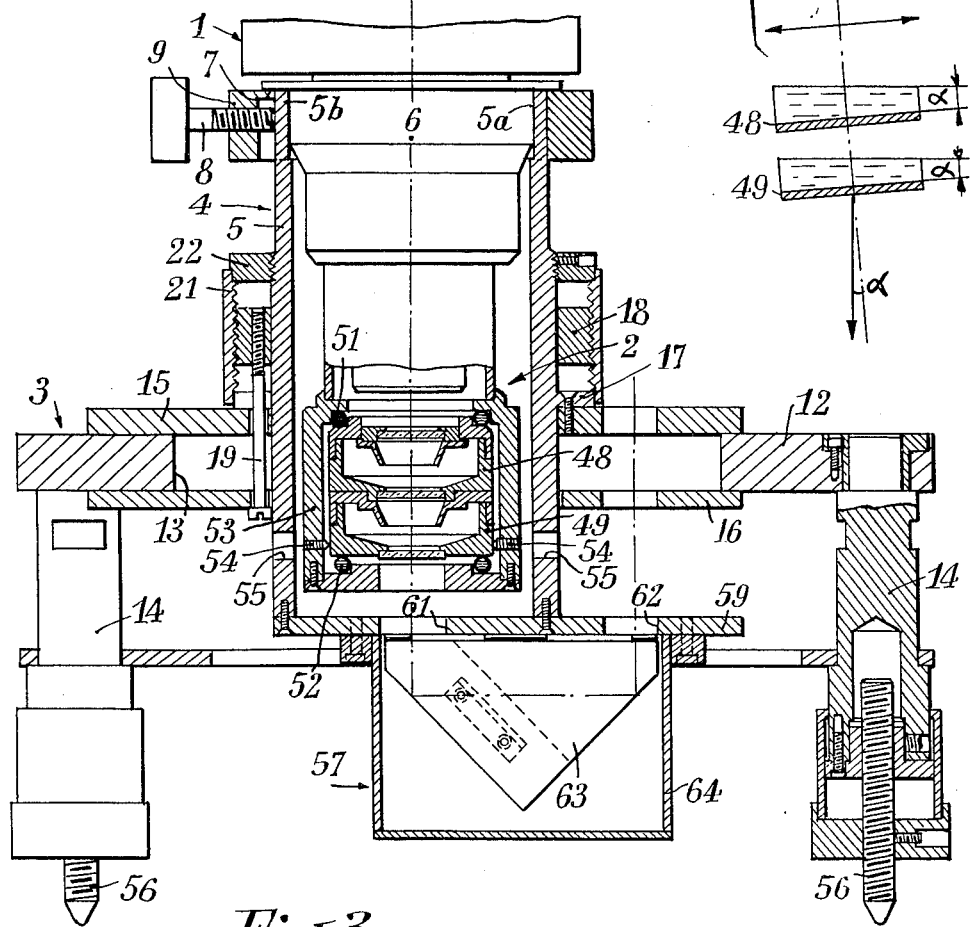
FIG. 1 is a view partly in vertical section, and partly in elevation of a laser unit constructed according to the teachings of the present invention.

In both embodiments illustrated in the drawings the base structure 3 comprises essentially a substantially horizontal main platform 12 in which a relatively large aperture 13 is formed; this main platform 12 is supported by a tripod structure comprising vertically adjustable legs 14 (of which only two are visible in FIGS. 1 and 4). Thus, a rough adjustment of the horizontality of platform 12 and consequently of the verticality of the axis of socket 5 (connected to said platform 12 by means to be described presently can be made by means of said adjustable legs 14 in combination with a spherical bubble level (not shown). In the embodiment shown in FIG. 1 the aperture 13 is substantially centered to the platform 12 and in the modified embodiment of FIGS. 4 and 5 this aperture 13 is formed in a lateral extension 12a of platform 12 which is disposed externally of the triangle having its apices coincident with the axes of the platform legs 14.

In both embodiments illustrated in the drawings the socket 5 is movable in, or in front of, the aperture 13 of platform 12 due to the provision of guide means whereby the socket 5 can be moved in any desired horizontal direction, means being also provided for blocking the socket 5 in relation to said platform 12 when the former has been brought to the desired position.

In the specific embodiment shown in FIG. 1 the above-mentioned guide means consist of a pair of parallel, horizontal plates 15 and 16 adapted to slide on the opposite faces of platform 12 and comprising coaxial circular openings through which said socket 5 can project. The socket 5 further comprises intermediate its ends a flange 17 rigid or formed integrally therewith, which is used for securing the socket 5 to the horizontal plate 15 by means of screws. On the other hand, the socket 5 can slide freely through the circular opening formed in plate 16. Moreover, the above-mentioned blocking means comprise clamping or tightening means which, according to the direction in which they are actuated, engage the plate 16 to either move same towards the plate 15 and thus clamp the platform 12 therebetween, so that the socket 5 is blocked in relation to said platform, or move said plate 16 away from plate 15 and thus enable said plates 15 and 16 to slide freely on platform 12. The above-described clamping means comprise a first ring 18 surrounding the socket 5 and adapted to slide axially therealong. This ring 18 has external screw-threads formed thereon and is held against rotation about the socket 5 by a set of three screws 19 (of which only one is visible in FIG. 1) extending parallel to the axis of socket 5 through radial slots formed in flange 17 and also through holes formed in plates 15 and 16. Furthermore, said clamping means comprise another ring 21 formed with inner threads engaging the outer threads of ring 18. The ring 21 is adapted to rotate but is held against axial movement on the external cylindrical surfaces of flange 17 and of another ring 22 screwed on said socket 5 at a certain axial distance from said flange 17.

Thus, when the operator rotates the ring 21 in a first direction, the ring 18 is moved for instance upwards so that the screws 19 draw the plate 16 towards plate 15 and thus clamp the platform 12 therebetween. On the other hand, when ring 21 is rotated in a direction opposite said first direction, ring 18 is moved downwards and plate 16 is moved away from plate 15 by gravity, whereby these plates 16 and 15 can slide on the opposite surfaces of platform 12.

In the modified construction illustrated in FIGS. 4 and 5 the above-mentioned guide means consist essentially of a pair or slideway disposed horizontally at right angles to each other. Socket 5 is secured by means of screws 23 to the movable member or slide 24 of the first one of said pair of slideways. Slide 24 is guided horizontally in a guide carried by the movable member or slide 25 of the second slideway. The guide for slide 24 may consist for example of a dovetail-sectioned groove 26 formed in slide 25 and extending substantially horizontally at right angles to the horizontal direction of movement of said slide 25. The slide 25 is guided by guide means carried by the extension 12a of platform 12 and consisting for example of a dovetail groove 27 formed in said extension 12a of platform 12.

In addition and as shown in FIG. 5, secured to said slide 24 is a rack 28 meshing with a pinion 29 secured to one end of a shaft 31 rotatably mounted in a block 32 secured to the slide 25. A control handwheel 33 is secured to the opposite end of shaft 31, and when this handwheel 33 is rotated manually in one or the other direction the pinion 29 is caused to rotate in the same direction so as to drive the rack 28 and thus move the slide 24 in dovetail groove 26. Likewise, as illustrated in FIG. 4, a rack 34 is secured to slide 25 and meshes with a pinion 35 secured to one end of a shaft 36 rotatably mounted in a block 37 secured to platform 12. A control handwheel 38 secured to the opposite end of shaft 36 is provided for rotating the pinion 35 and thus drive the slide 25 in dovetail groove 27. If the laser 1 is arranged for directing the beam issuing therefrom vertically downwards, as disclosed hereinafter said slides 24 and 25 comprise openings 39 and 41, respectively, to permit the passage of the laser beam therethrough.

Figure 6:
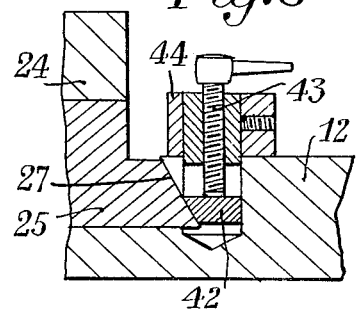

Moreover, as illustrated in FIG. 6, the slide 25 may be blocked in any desired position in the dovetail groove 27 by means of a blocking wedge 42 which is adapted to be pressed firmly against the inclined edge of slide 25 by means of a screw 43 formed with a manually operable head and engaging a tapped hole in a block 44 secured to said platform 12. In a similar fashion and as shown in FIG. 7, the slide 24 may be blocked in any desired position in dovetail groove 26 by means of a blocking wedge 45 adapted to be tightly pressed against the inclined edge of slide 24 by means of another screw 46 having a manually operable head and screwed in a block 47 secured to slide 25.

In both embodiments of the device illustrated in the drawings the laser is so disposed that its outlet window lies at the bottom or lower end of the laser and that the laser beam is directed vertically downwards. Moreover, the optical device for automatically correcting the verticality of this beam is secured coaxially to the laser 1 at the lower end thereof.

A typical example of an optical device 2 will now be described with reference to FIGS. 1 and 2; of course, the optical device shown in dash and dot lines in FIG. 4 may be similar to the device described hereinafter.

As shown in FIG. 1, the optical device 2 comprises a pair of cylindrical cups 48 and 49 disposed coaxially one above the other and containing a liquid having an index of refraction of 1.5. The first or upper cup 48 is closed by a cover fitted or screwed thereon, and the other cup 49 is closed partly by another cover fitted or screwed thereon, and partly by the bottom of the upper cup 48 fitted or screwed in the cover of cup 49. Both cups 48 and 49 and the cover of cup 48 comprise windows aligned with the cup axis to permit the passage of the laser beam. Each of said windows consists of a parallel-faced transparent blade, and all these transparent blades are parallel to each other. The assembly comprising the two cups 48 and 49 is resiliently mounted between a pair of flexible o-rings 51 and 52 in a cylindrical case 53 secured at its upper end, for example by screwing, to the lower end of the case of laser 1 and coaxially thereto. The top and bottom of the case 53 are each provided with a coaxial aperture permitting the passage of the laser beam.

Moreover, adjustment means adapted to be actuated from the outside for adjusting the orthogonality of the parallel-faced transparent blades of both cups 48 and 49 and of the cover of cup 48 with respect to the incident laser beam within the case 53 are provided. These adjustment means may consist for example of four screws 54 (of which only two are shown in FIG. 1). These screws are spaced 90° apart, engage tapped holes formed in the cylindrical wall of case 53, and project inside ease 53 so as to act against the cylindrical wall of cup 49. Four holes 55 are drilled through the socket 5 in alignment with said screws 54, so that the latter can be turned by means of a screwdriver.

Now reference will be made to FIG. 2 to illustrate the principle of operation of the optical device 2 for automatically correcting the verticality of the laser 1. Firstly, it will be assumed that the orthogonality of the parallel-faced transparent blades of cups 48 and 49 and of the cover of cup 48 with respect to the incident laser has been adjusted from the onset by means of said screws 54 in a manner to be explained presently. Now if for any reason the laser unit assumed a position such that the axis of the beam emitted by the laser 1 formed a relatively small angle α with respect to the true vertical, the bottom of both cups 48 and 49 would be inclined as shown in FIG. 2, so that two liquid prisms having a vertex angle α would result. The combination of these two liquid prisms would deflect the laser beam by an angle D given by the following formula:

$$D = 2(n-1)\alpha$$

Since the index of refraction n of the two liquids is 1.5, it is clear that $D = \alpha$, so that after having passed through the two liquid prisms the laser beam emerges vertically therefrom.

The laser assembly or unit according to any of the two examplary embodiments described hereinabove operates as follows:

When the laser unit is brought to the site where the projected operation or observation is to be accomplished, the operator firstly adjusts the horizontality of platform 12 by adjusting the height of legs 14 by means of the relevant screws 56, until the bubble of the spherical level carried by said platform 12 is exactly at the center of said level. Then, the operator releases the screw 8 so that the laser 1 can rotate in its socket 5. Thus, if when rotating the laser 1 in socket 5 the laser beam traces or draws a small circle on a target, this proves that the laser beam emerging from the optical device 2 is not perfectly vertical, because the parallel-faced transparent blades of cups 48 and 49 and of the cover of cup 48 are not orthogonal to the incident laser beam. Therefore, the orthogonality of these parallel-faced transparent blades must be adjusted by means of the set screws 54 until the beam forms only a pin-point mark on the target when the laser 1 is rotated about its geometrical axis. Under these conditions, the laser beam emitted by the laser 1 is perfectly vertical. If later on and for any reason the laser unit assumed any position such that the geometrical axis of the laser diverges slightly, by an angle α, from the vertical, the optical device 2 would automatically correct the path of the laser beam and restore its verticality. Upon completion of the above-described adjustments the screw 8 can again be tightened to block the laser 1 in relation to its supporting socket 5. The impact point of the laser beam on the target may be modified within certain limits by either causing the plates 15 and 16 to slide with respect to the platform 12, as already described in the foregoing with reference to FIG. 1, or utilizing the pair of orthogonal slideways, as also described hereinabove with reference to FIGS. 4 and 5.

In the arrangements described, the laser unit is adapted to direct the laser beam vertically downwards. However, the laser unit may also be operated if desired in combination with a device 57 (FIG. 1) for reversing the direction of the laser beam, or alternatively with a device 58 (FIG. 3) for reflecting said laser beam in a direction set at 90° to its original direction.

To this end, as shown in FIG. 1, a plate 59 is secured to the lower portion of socket 5 and projects on one side of the socket. This plate 59 comprises a first aperture 61 coaxial to socket 5 and a second eccentric aperture 62 located externally of socket 5. The reversing device 57 consists essentially of a tetrahedral prism 63 of the so-called "cube corner" type, housed in a case 64 detachably secured to the plate 59 and adapted to reflect vertically upwards through the aperture 62 the laser beam entering vertically downwards the prism through the aperture 61.

Figure 3:
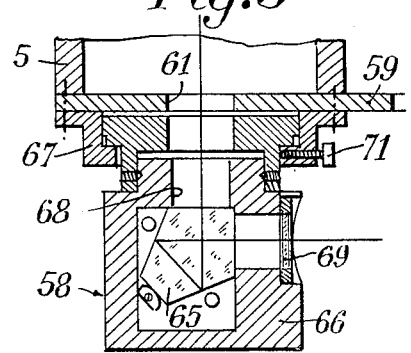
FIG. 3 is a fragmentary vertical section showing a modified embodiment.

The device 58 illustrated in FIG. 3 consists essentially of a pentahedral prism 65 adapted to direct horizontally, after a double bond, the vertical downward laser beam received through the aperture 61. This pentahedral prism 65 is housed in a case 66 rotatably mounted in a support 67 detachably secured to the aforesaid plate 59 whereby the axis of rotation of case 66 merges with the geometric axis of socket 5. The case 66 further comprises an aperture 68 for the incoming laser beam and another aperture 69 for the outgoing laser beam, a set screw 71 engaging a tapped hole formed in support 67 being provided for blocking the case 66 in any desired angular position.

Of course, the various embodiments described hereinabove with reference to the accompanying drawings should not be construed as limiting the present invention, since many modifications and changes may be brought thereto without departing from the basic principles of the invention as set forth in the appended claims.

What is claimed as new is:

1. A laser unit for directing a laser beam in a strictly vertical direction which comprises a laser proper, an afocal system, a base structure having means for supporting said laser and afocal system in a position such that said laser has its axis disposed in a substantially vertical position, an optical device for automatically correcting the verticality of the laser beam emitted from said laser, said optical device being located after said afocal system on the substantially vertical path of said laser beam and comprising a pair of coaxially superposed cups containing a liquid having an index of refraction of 1.5, the bottom of each one of said cups consisting at least partly of a parallel-faced transparent blade, said blades being parallel to each other, said support means comprising means allowing the assembly of said laser, focal system and automatic correction device to rotate about the substantially vertical axis of said laser beam, said cups being housed in a cylindrical case having coaxial top and bottom aperture permitting the passage of the laser beam, said case being secured coaxially to said laser, and adjustment means adapted to be actuated from the outside of said case for adjusting the orthogonality of said parallel-faced transparent blades of said pair of cups with respect to the incident laser beam.

2. Laser unit as set forth in claim 1, wherein said laser comprises in its lower portion a cylindrical bearing surface coaxial to said laser beam and an axial bearing surface facing downwards, said support means comprising a cylindrical socket having a substantially vertical axis for receiving the bottom portion of said laser, the axial bearing surface thereof engaging the upper end of said socket, the cylindrical bearing surface of said laser being rotatably engaged without play in said socket.

3. Laser unit as set forth in claim 2, wherein said socket comprises first blocking means for preventing said laser from rotating in said socket.

4. Laser unit as set forth in claim 2, wherein said base structure comprises a substantially horizontal platform formed with an aperture and supported by vertically adjustable legs for adjusting the horizontality of said platform, and guide means for movably supporting said socket in relation to the aperture of said platform and for allowing movements thereof in all horizontal directions.

5. Laser unit as set forth in claim 4, wherein second blocking means are provided for holding said socket against movement in a selected position in relation to said platform.

6. Laser unit as set forth in claim 4, wherein said guide means comprise a pair of parallel horizontal plates adapted to slide on the opposite surfaces of said platform, respectively, and having circular coaxial apertures permitting the passage of said socket, a first one of the plates of said pair being secured to said socket, the other plate of the pair being adapted to slide axially along said socket, said second blocking means consisting of clamping means engaging said other plate of the pair and being operable for moving said other plate towards and away from said first plate.

7. Laser unit as set forth in claim 4, wherein said guide means comprise a first slide movable in a first horizontal direction across said platform aperture, first guide means on the platform for guiding said first slide in said first horizontal direction, a second slide movable in a second horizontal direction perpendicular to said first horizontal direction, second guide means on said first slide for guiding said second slide in said second horizontal direction, said socket being secured to said second slide and both slides comprising each an aperture permitting the passage of the laser beam.

8. Laser unit as set forth in claim 7, wherein a rack is associated with each slide and in meshing engagement with a pinion, each pinion being drivingly connected with a handwheel for manually controlling the rotation of said pinion and thus moving the slide associated therewith in a corresponding horizontal direction.

9. A laser unit as set forth in claim 2, wherein a plate is secured to the bottom end of said socket, projects on one side thereof and comprises a first aperture coaxial to said socket and a second eccentric aperture located externally of said socket.

10. A laser unit as set forth in claim 9, further comprising a device for reversing the direction of the laser beam, said reversing device being adapted to be detachably secured to said plate and comprising a tetrehedral prism adapted to reflect vertically upwards through the second aperture of said plate the laser beam entering said prism in the downward direction through the first aperture of said plate.

11. A laser unit as set forth in claim 9, further comprising a device for reflecting the incoming laser beam from said laser in a direction perpendicular to its original direction, said device being adapted to be detachably secured to said plate and comprising a pentahedral prism for reflecting to the horizontal the vertical downward laser beam passing through the first aperture of said plate.

12. A laser unit as set forth in claim 11, wherein said pentahedral prism is housed in a case rotatably mounted in relation to said plate about a geometrical axis merging into the socket axis, whereby said horizontal laser beam issuing from said pentahedral prism can scan a horizontal plane.

* * * * *